(12) United States Patent
Heo

(10) Patent No.: US 9,588,645 B2
(45) Date of Patent: Mar. 7, 2017

(54) MOBILE TERMINAL AND FAN-SHAPED ICON ARRANGEMENT METHOD THEREOF

(71) Applicant: LG ELECTRONICS INC., Seoul (KR)

(72) Inventor: Junyong Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 13/705,525

(22) Filed: Dec. 5, 2012

(65) Prior Publication Data
US 2013/0145316 A1  Jun. 6, 2013

(30) Foreign Application Priority Data

Dec. 6, 2011 (KR) .......................... 10-2011-0129777

(51) Int. Cl.
| | | |
|---|---|---|
| *G06F 3/0482* | (2013.01) | |
| *G06F 3/0481* | (2013.01) | |
| *G06F 3/0488* | (2013.01) | |
| *G06F 3/01* | (2006.01) | |

(52) U.S. Cl.
CPC .......... *G06F 3/0482* (2013.01); *G06F 3/0488* (2013.01); *G06F 3/04817* (2013.01); *G06F 3/04883* (2013.01); *G06F 3/016* (2013.01)

(58) Field of Classification Search
CPC ..... G06F 3/0482; G06F 3/04883; G06F 3/016
USPC .................. 715/810, 844, 834, 830; 345/173
See application file for complete search history.

(56) References Cited

U.S. PATENT DOCUMENTS

| | | | | |
|---|---|---|---|---|
| 2004/0160463 | A1* | 8/2004 | Battles et al. ................ | 345/814 |
| 2008/0163112 | A1* | 7/2008 | Lee et al. ...................... | 715/810 |
| 2008/0163119 | A1* | 7/2008 | Kim et al. .................... | 715/840 |
| 2009/0064055 | A1 | 3/2009 | Chaudhri et al. | |
| 2009/0109187 | A1* | 4/2009 | Noma .......................... | 345/173 |
| 2010/0013780 | A1* | 1/2010 | Ikeda .................. | G06F 3/04883 345/173 |
| 2010/0093400 | A1* | 4/2010 | Ju et al. ........................ | 455/566 |
| 2010/0124946 | A1 | 5/2010 | Chun | |

(Continued)

FOREIGN PATENT DOCUMENTS

| | | |
|---|---|---|
| CN | 101739207 A | 6/2010 |
| CN | 101821707 A | 9/2010 |
| CN | 102118514 A | 7/2011 |

OTHER PUBLICATIONS

Fritz, "What is an idle screen?", <URL https://answers.yahoo.com/question/index?qid=20111023123327AAsj5N0/>, p. 1-2.*

*Primary Examiner* — Ajay Bhatia
*Assistant Examiner* — Mong-Shune Chung
(74) *Attorney, Agent, or Firm* — Birch, Stewart, Kolasch & Birch, LLP

(57) ABSTRACT

A method of operating an icon display unit of a mobile terminal is provided. The method includes storing registered icons and configuration information, displaying an icon display unit on a screen of the mobile terminal within a movement range of a user's thumb according to the configuration information, the icon display unit having a predetermined shape, displaying one or more of the registered icons on the icon display unit and executing a particular icon on the icon display unit according to a first touch input applied to the particular icon. A mobile terminal is also provided.

17 Claims, 11 Drawing Sheets

(56) References Cited

U.S. PATENT DOCUMENTS

| | | | |
|---|---|---|---|
| 2010/0205563 A1* | 8/2010 | Haapsaari | G06F 3/0485 |
| | | | 715/825 |
| 2010/0241985 A1* | 9/2010 | Kim et al. | 715/773 |
| 2010/0279738 A1* | 11/2010 | Kim | G06F 3/016 |
| | | | 455/566 |
| 2010/0281374 A1* | 11/2010 | Schulz et al. | 715/723 |
| 2012/0036434 A1* | 2/2012 | Oberstein | 715/702 |
| 2013/0019182 A1* | 1/2013 | Gil et al. | 715/738 |
| 2013/0104079 A1* | 4/2013 | Yasui et al. | 715/834 |

* cited by examiner

[ MOVE BY TOUCH AND DRAG]

MOBILE TERMINAL AND FAN-SHAPED ICON ARRANGEMENT METHOD THEREOF

CROSS REFERENCE TO RELATED APPLICATIONS

Pursuant to 35 U.S.C. §119(a), this application claims the benefit of earlier filing date and right of priority to Korean Application No. 10-2011-0129777, filed on Dec. 6, 2011, the contents of which is incorporated by reference herein in its entirety.

BACKGROUND OF THE INVENTION

Field of the Invention

The present invention relates to a mobile terminal in which icons are arranged in a fan-shape within a movement range of users' fingers to allow users to freely touch the icons, and a fan-shaped icon arrangement method thereof.

Description of the Related Art

Mobile terminals may be configured to perform various functions. Such various functions include a data and voice communication function, a function of capturing an image or a video through a camera, a voice storage function, a function of playing or reproducing a music file through a speaker system, a function of displaying an image or a video, and the like. Some mobile terminals include an additional function of executing games, while some other mobile terminals may be implemented as a multimedia device. In addition, recently, mobile terminals may receive broadcast or multicast signals to allow for viewing of a video or a television program.

In addition, efforts are ongoing to support and increase the functionality of mobile terminals. Such efforts include software and hardware improvements, as well as changes and improvements in the structural components which form mobile terminals.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components which form the mobile terminal. A touch function of a mobile terminal allows a user to conveniently perform an operation of a terminal by using a touch screen although the user is not accustomed to inputting button or keys. Recently, a touch function has established a solid foothold as a critical function of a mobile terminal together with user interfaces (UIs). Thus, as the touch function is applied in various forms to mobile terminals, the development of a pertinent user interface is desirable.

Recently, as an LCD screen of a smart phone has increased in size (four inches or larger), it is increasingly difficult to touch a particular icon or a desired item with one hand for manipulation of the icon or item. Namely, when manipulating a mobile terminal with one hand, most users tend to hold a mobile terminal with their palm and touch a screen with their thumb. However, as the LCD screens are increasing in size and more applications and relevant icons are being displayed thereon, user may manipulate only applications or icons within a limited range of their thumb.

Also, applications or relevant icons displayed on the screen of a mobile terminal are displayed in generated order unless the user particularly selects positions for them. Thus, the generated applications relevant icons may be convenient to right-handers but inconvenient to left-handers, or vice versa.

Thus, in the situation in which the screen of mobile terminals is increased and applications and relevant icons displayed on the large screen are increased, an effective icon arrangement will increase user convenience.

SUMMARY OF THE INVENTION

Therefore, an aspect of the detailed description is to provide a mobile terminal capable of arranging icons within a movement range of a user's thumb to allow a user to execute a desired function with one hand, and a fan-shaped icon arrangement method thereof.

Another aspect of the detailed description is to provide a mobile terminal capable of providing an icon arrangement form fitting left-handers and right-handers, and a fan-shaped icon arrangement method thereof.

To achieve these and other advantages and in accordance with the purpose of this specification, as embodied and broadly described herein, a method of operating an icon display unit of a mobile terminal is provided. The method includes storing registered icons and configuration information, displaying an icon display unit on a screen of the mobile terminal within a movement range of a user's thumb according to the configuration information, the icon display unit having a predetermined shape, displaying one or more of the registered icons on the icon display unit and executing a particular icon on the icon display unit according to a first touch input applied to the particular icon.

In addition, a mobile terminal is provided. The mobile terminal includes a memory configured to store icons and configuration information, a display unit configured to display a plurality of registered icons on a screen and a controller configured to control the display of an icon display unit having a predetermined shape within an movement range of a user's thumb according to the stored configuration information and to display one or more registered icons on the icon display unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself. Accordingly, the 'module' and 'part' may be mixedly used.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

Figure 1:
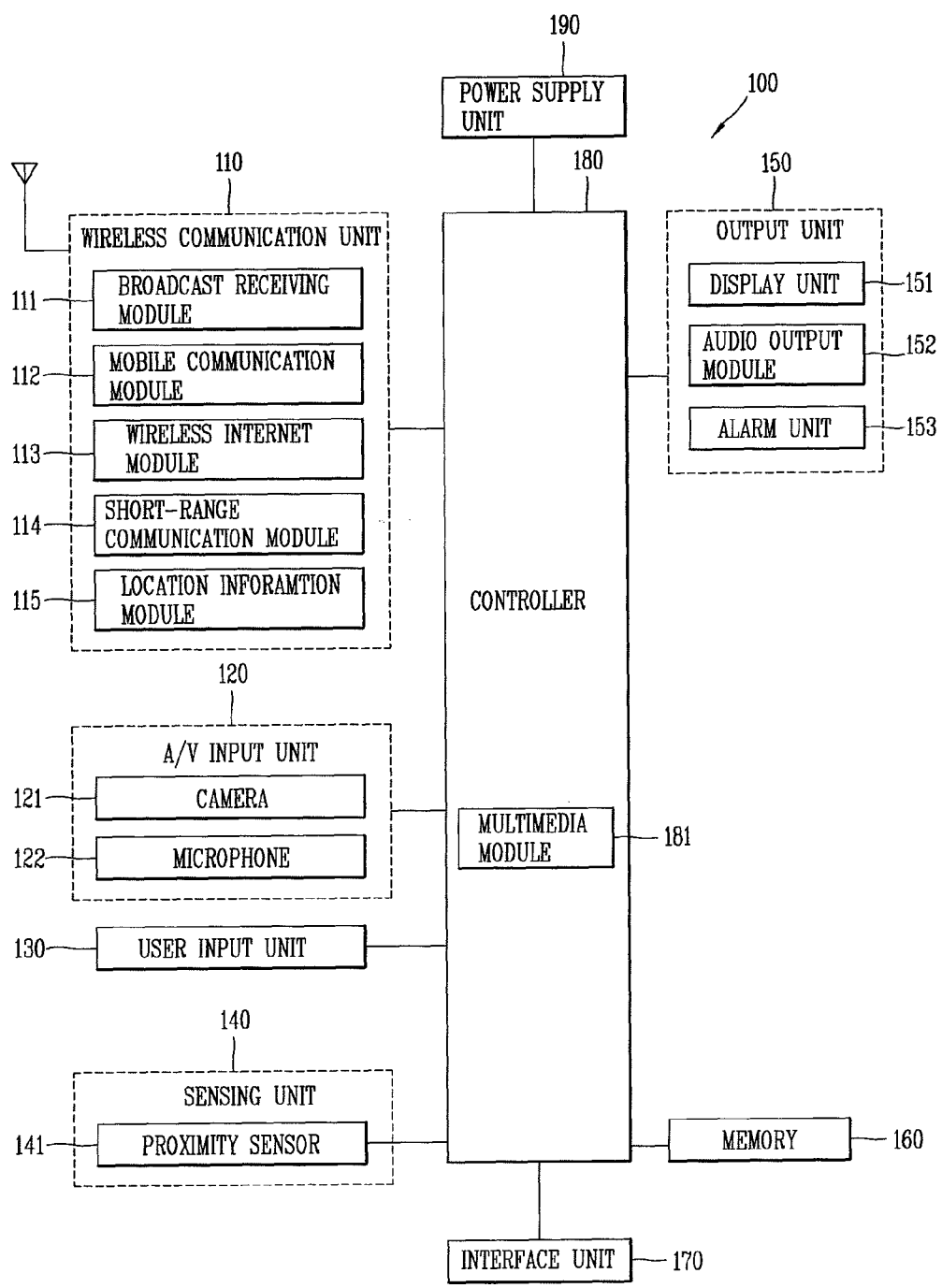
FIG. 1 is a block diagram of a mobile terminal in relation to an embodiment of the present invention.

FIG. 1 is a block diagram of a mobile terminal according to an embodiment of the present invention. The mobile terminal 100 may include a wireless communication unit 110, an A/V (Audio/Video) input unit 120, a user input unit 130, a sensing unit 140, an output unit 150, a memory 160, an interface unit 170, a controller 180, a power supply unit 190 and the like. FIG. 1 shows the mobile terminal as having various components, but it should be understood that implementing all of the illustrated components is not a requirement. Greater or fewer components may alternatively be implemented.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this instance, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 during the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. This will be described in relation to a touch screen later.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip that stores various information for authenticating a user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals input from the cradle to be transferred to the mobile terminal therethrough. Various command signals or power input from the cradle may be operated as a signal for recognizing that the mobile terminal is accurately mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit and an internal display unit. The touch screen may be configured to detect even a touch input pressure as well as a touch input position and a touch input area.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or the like.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 may store software programs or the like used for the processing and controlling operations performed by the controller 180, or may temporarily store data (e.g., a phonebook, messages, still images, video, etc.) that have been output or which are to be output. Also, the memory 160 may store data regarding various patterns of vibrations and audio signals output when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images.

The power supply unit 190 receives external power or internal power and supplies appropriate power required for operating respective elements and components under the control of the controller 180.

Various embodiments as described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180. For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, a slide-type mobile terminal, among various types of mobile terminal such as folder-type, bar-type, swing-type, slide type mobile terminals, or the like, will be described as an example for the sake of brevity. Thus, the present invention can be applicable to any type of mobile terminal, without being limited to the slide-type mobile terminal.

The mobile terminal 100 as shown in FIG. 1 may be configured to operate with a communication system, which transmits data via frames or packets, such as wired and wireless communication systems, as well as satellite-based communication systems. Such communication systems in which the mobile terminal according to an embodiment of the present invention can operate will now be described with reference to FIG. 2. These communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 2:
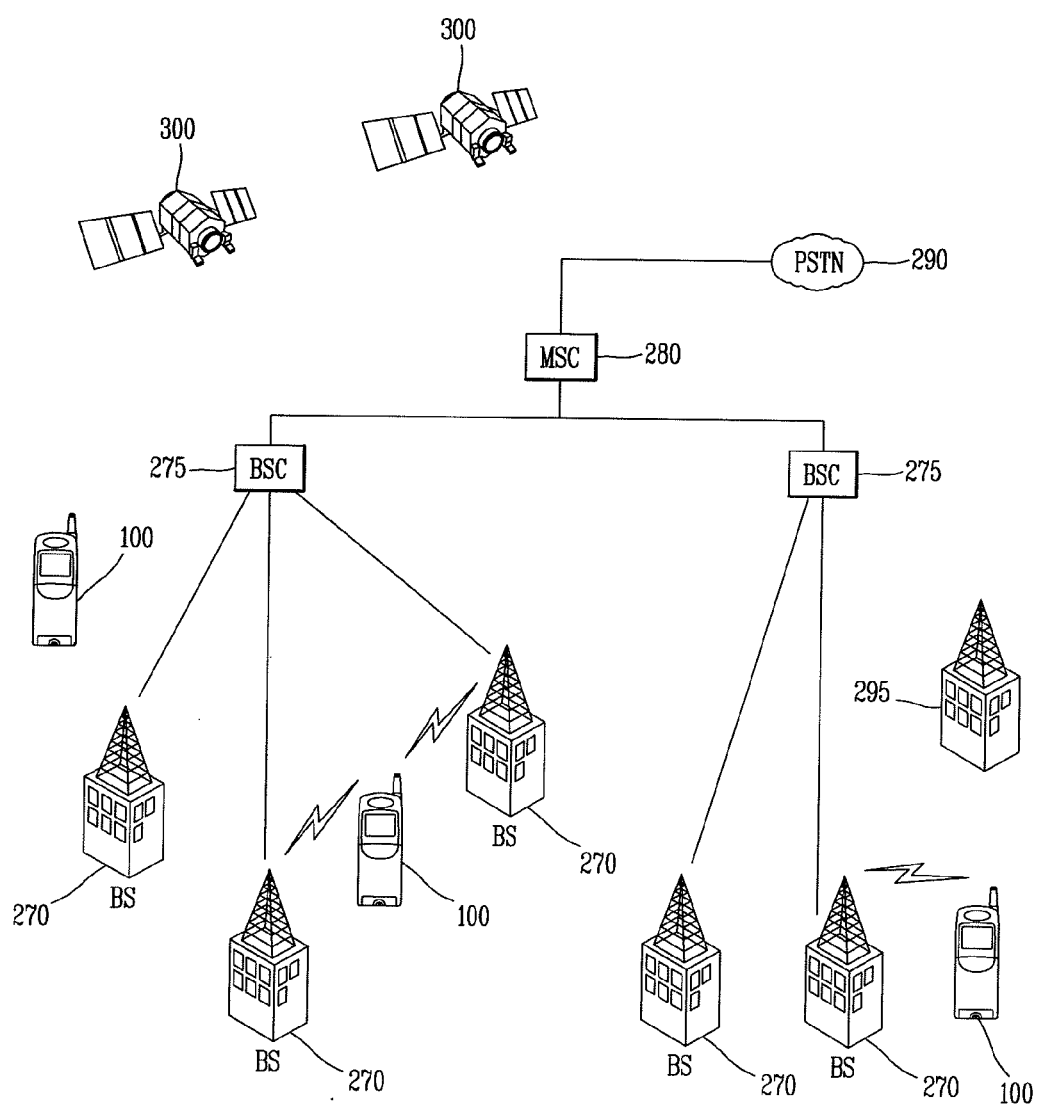
FIG. 2 is a block diagram of a wireless communication system with which the mobile terminal according to an embodiment of the present invention is operable.

Referring to FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In this situation, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295. In FIG. 2, several global positioning systems (GPS) satellites 300 are shown. The satellites 300 help locate at least one of a plurality of terminals 100.

In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Figure 3:
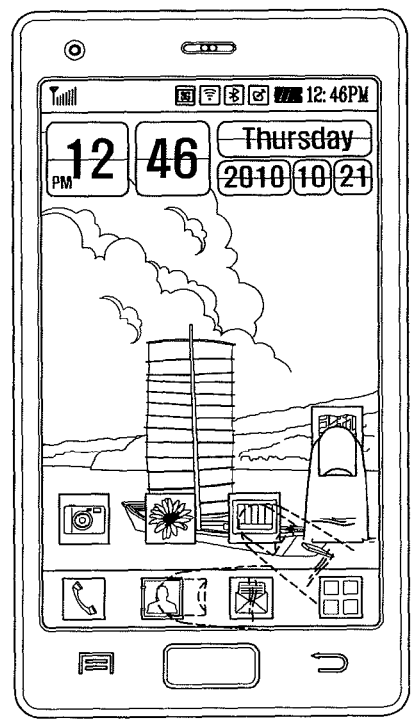
FIG. 3 is a view illustrating a movement range of a user's finger on a mobile terminal when the user grasps the mobile terminal according to an embodiment of the present invention.

Although smart phones or mobile terminals have a great deal of applications and corresponding icons, only a few of them tend to be frequently used. In particular, essential applications to be executed quickly with a user's one hand are very rare. However, when users manipulate a mobile terminal with one hand, that is when they touch a screen with their thumb with the mobile terminal in that hand, a movement range of the thumb has a fan-shape (see FIG. 3). Thus, an arrangement of frequently used icons in a fan-shape based on a user's finger in motion will help the user conveniently touch the icons.

In an embodiment of the present invention, frequently used or essential applications designated by a user are registered in a manner similar to bookmarking, and then, are displayed in a predetermined form on an icon display unit (or an icon rotational plate) within a touch radius of the user's thumb according to a user selection. The icons displayed in the icon display unit may be those duplicated from an idle screen. The icon display unit may be displayed in a predetermined form at one side of a screen, and the predetermined form may be a fan-shape as a portion of a circular icon arrangement. The icons displayed in the icon display unit in the fan-shape may be fixed or rotatable, and the fan-shaped icon display unit may be upsized or downsized according to a user touch (or according to a touch applied thereto by the user). The fan-shaped icon display unit may be displayed in a lower end portion of the left or right side of the screen to fit a left-hander and a right-hander according to a user setting.

Figure 4:
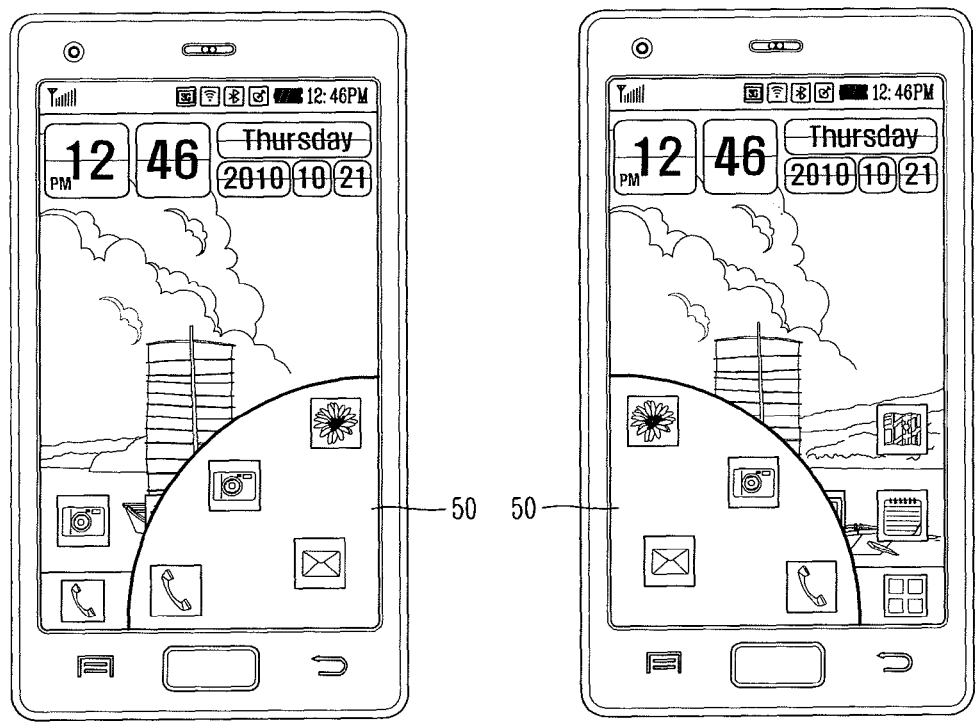
FIG. 4 is a view illustrating an icon arrangement form of the mobile terminal according to an embodiment of the present invention.

FIG. 4 is a view illustrating an icon arrangement form of a mobile terminal according to an embodiment of the present invention. As illustrated in FIG. 4, an icon display unit 50 having a fan-shape is displayed in a left lower end portion or right lower end portion of the screen. One or more icons the user frequently uses are displayed in the fan-shape icon display unit 50. The icon display unit 50 is positioned within a movement range of the user's thumb to allow the user to select and execute a particular function while the user is holding the mobile terminal in his hand. One or more icons displayed in the icon display unit 50 are registered in a manner similar to menus or bookmarking. Here, icons corresponding to frequently used or essential icons may be disposed at an outer side, while normally used icons, e.g., menu icons, may be disposed at an inner side.

When the user is right-handed, the icon display unit 50 is displayed in a right lower end portion of the screen, and when the user is left-handed, the icon display unit 50 is displayed in a left lower end portion. A display position of the icon display unit 50 is determined according to a user setting through a menu. For simplicity, the following description will focus on the icon display unit 50 being displayed in a right lower end portion of the screen although it is not limited to the right lower end portion.

As for displaying of the icon display unit 50, when a certain portion of an icon display screen (e.g., an idle screen) is long-touched, when the screen is double-touched, or when a home key is pressed twice, the icon display unit 50 may be displayed and then disappear. The icon display unit 50 is displayed on the screen for a certain period of time, and when the certain period of time has lapsed, the icon display unit 50 may disappear or may be downsized.

Figure 5:
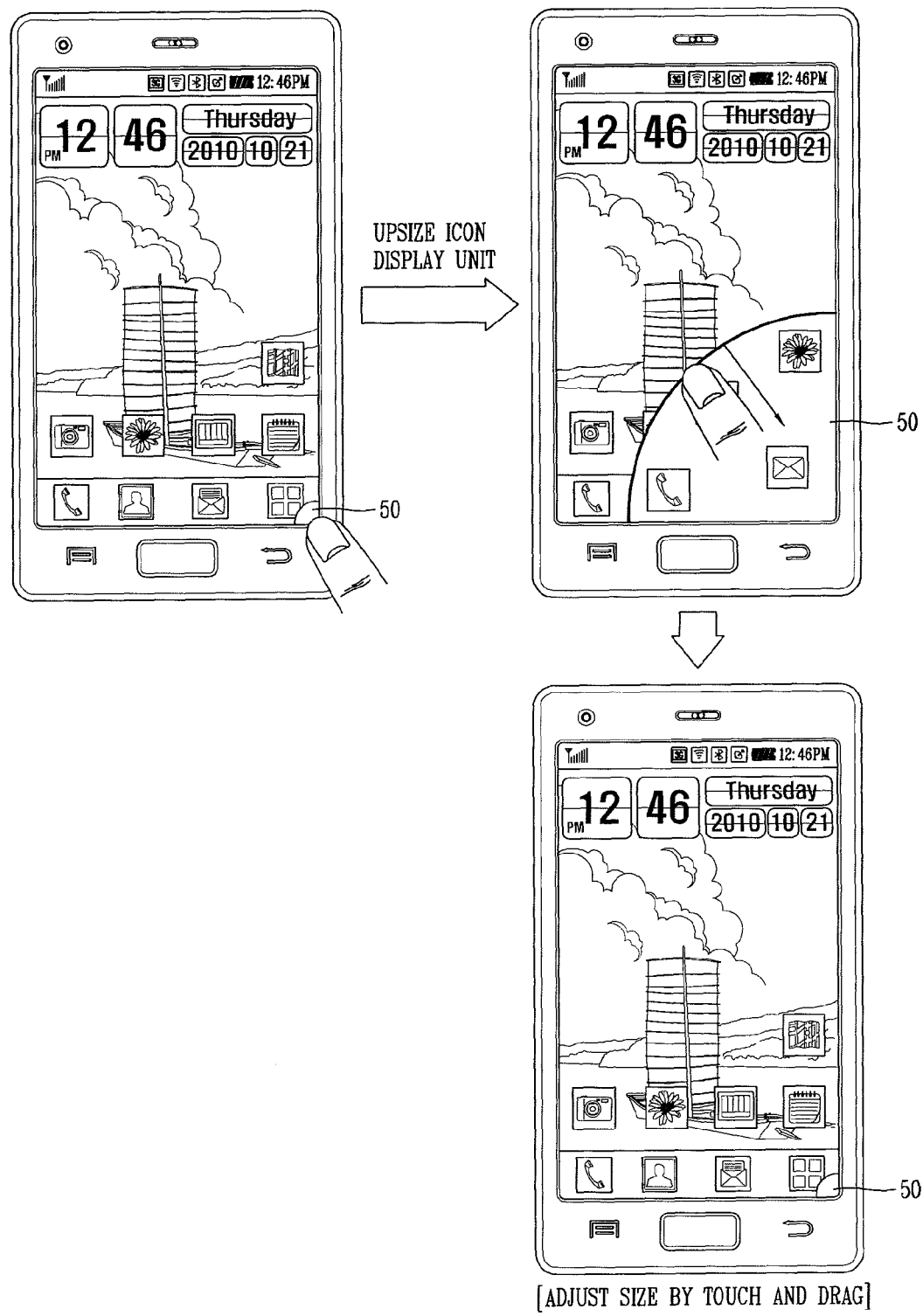
FIG. 5 is a view illustrating a view illustrating a display state of the icon display unit in an initial screen.

FIG. 5 is a view illustrating a display state of the icon display unit in an initial screen. As illustrated in FIG. 5, when the user sets a configuration of the icon display unit 50 to "ON" in a menu, the icon display unit 50 having a fan shape and a minimum size is displayed on the right lower end portion of the screen. When the icon display unit 50 is selected, the controller 180 upsizes the icon display unit 50 to display the same in the right lower end portion according to a user setting.

The user may select a particular icon in the upsized icon display unit 50, and execute an application corresponding to the selected icon. Although the application is executed, the display position of the icon display unit 50 is not changed.

Because the icon display unit 50 may be continuously displayed while the application is being executed, an operation or the user who is executing the application may be hindered, so the user may adjust the size of the icon display unit 50 through an input, such as a touch-and-drag, while the application is being executed. The size of the icon display unit 50 may be determined based on a distance by which dragging has been performed after touching, and when dragging is performed by more than a predetermined distance, the icon display unit 50 is downsized to have a minimum size. Also, when the user does not select a certain icon in the icon display unit 50 for a certain period of time, the controller may reduce the upsized icon display unit 50 to its original size and display the same. In the state in which the icon display unit 50 is reduced to have the minimum size, if the icon display unit 50 is not selected even after a predetermined period of time has lapsed, the controller 180 may make the icon display unit 50 disappear.

Thereafter, when the icon display unit 50, which has disappeared, is intended to be displayed again, the user may apply a long-touch to a certain portion of the screen, double-touch the screen, or press a home key twice to redisplay the icon display unit 50.

The icon display unit 50 illustrated in FIG. 4 is displayed in a fixed form. Such a form is displayed when the number of icons included in the icon display unit 50 does not exceed a predetermined number. However, when the user has registered icons to the icon display unit 50 that exceeds a predetermined number, the controller may automatically change an icon arrangement in the icon display unit 50 to be that of a rotational icon arrangement as shown in FIG. 6.

Alternatively, the user may directly select one of a fixed type icon arrangement or a rotational icon arrangement from a menu. In the situation of the rotational icon arrangement, the entirety of the icon display unit 50 may be rotated or only a portion thereof may be rotated such that only a portion of the rotational icon arrangement is shown at one time.

Figure 6:
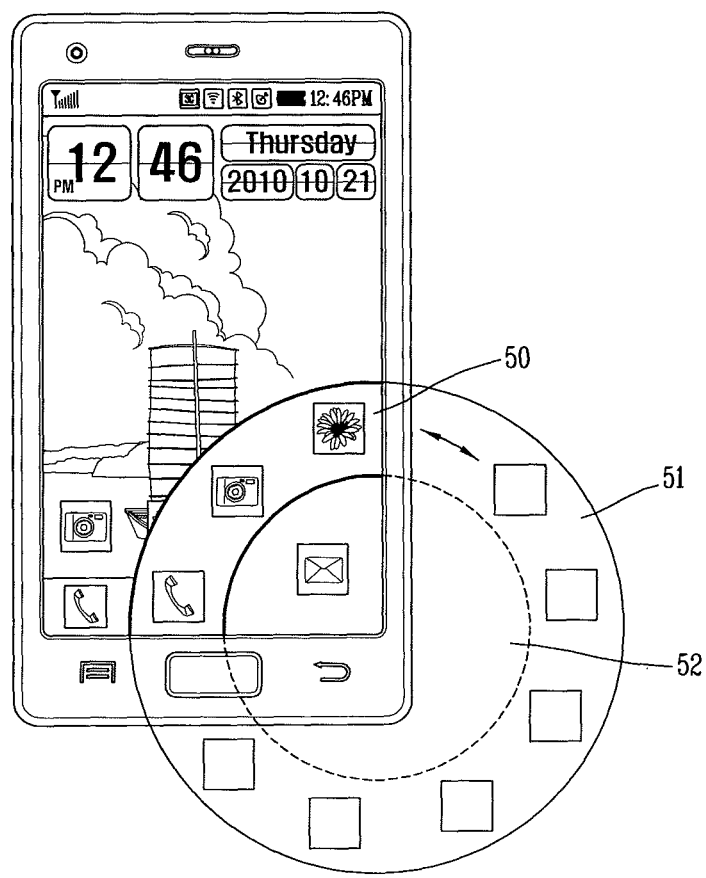
FIG. 6 is a view illustrating an example of an icon arrangement included in the icon display unit.

As illustrated in FIG. 6, the icon display unit 50 may be divided into a rotational region 51 and a fixed region 52. When many icons are included in the icon display unit 50, the user may touch (e.g., flick) the rotational region 51 to rotate it in a clockwise direction or counterclockwise direction. When the rotational region 51 is rotated according to a rotation direction, the plurality of icons is also rotated, so the user may select a desired icon from among the plurality of icons and select the same. Also, when icons included in the fixed region are more than a certain number of icons, the fixed region 52 may also be changed into a rotational region.

Figure 7:
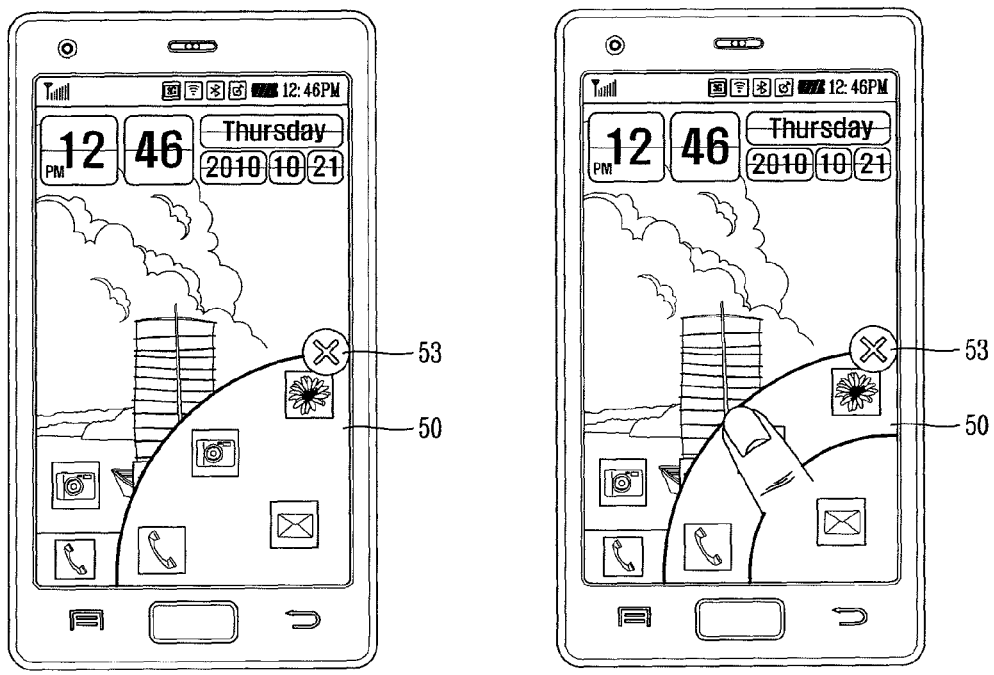
FIG. 7 is a view illustrating an example of generating a release button for releasing the icon display unit.

FIG. 7 is a view illustrating an example of generating a release button for releasing the icon display unit 50. When the icon display unit 50 is set, a release button 53 may also be displayed. However, the user may choose to not display the release button 53 by selecting an option in the setting menus. As shown in FIG. 7, when the user touches an edge of the icon display unit 50, the controller 80 may display the release button at one side of the icon display unit 50.

Figure 8A:
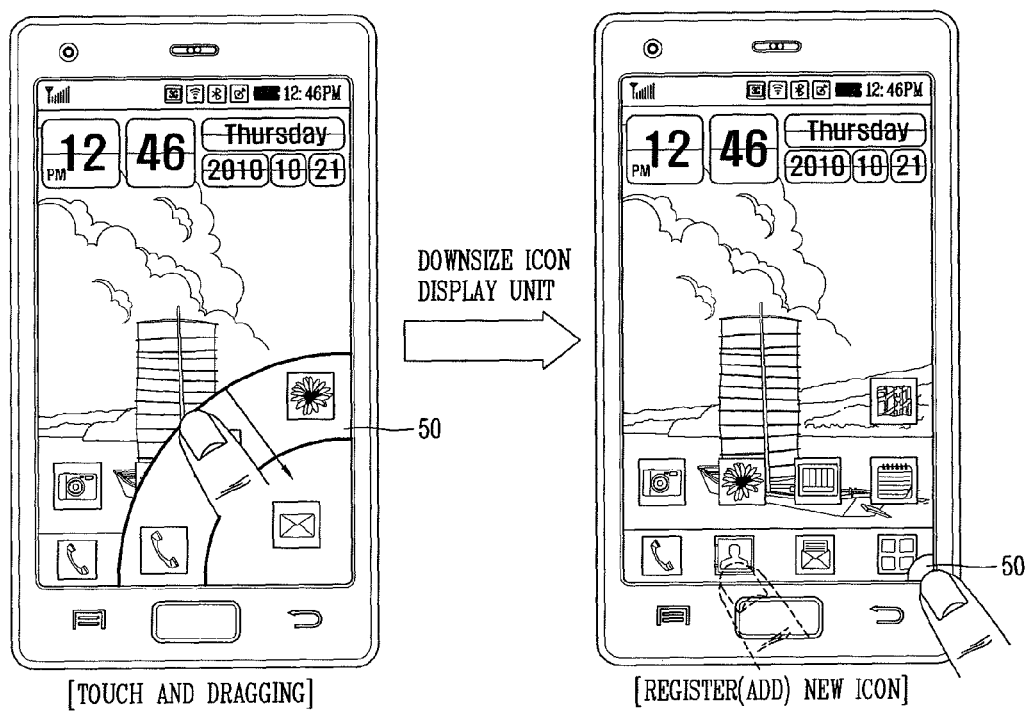
FIGS. 8A and 8B are views illustrating an example of additionally registering an icon to the icon display unit or deleting an icon.
Figure 8B:
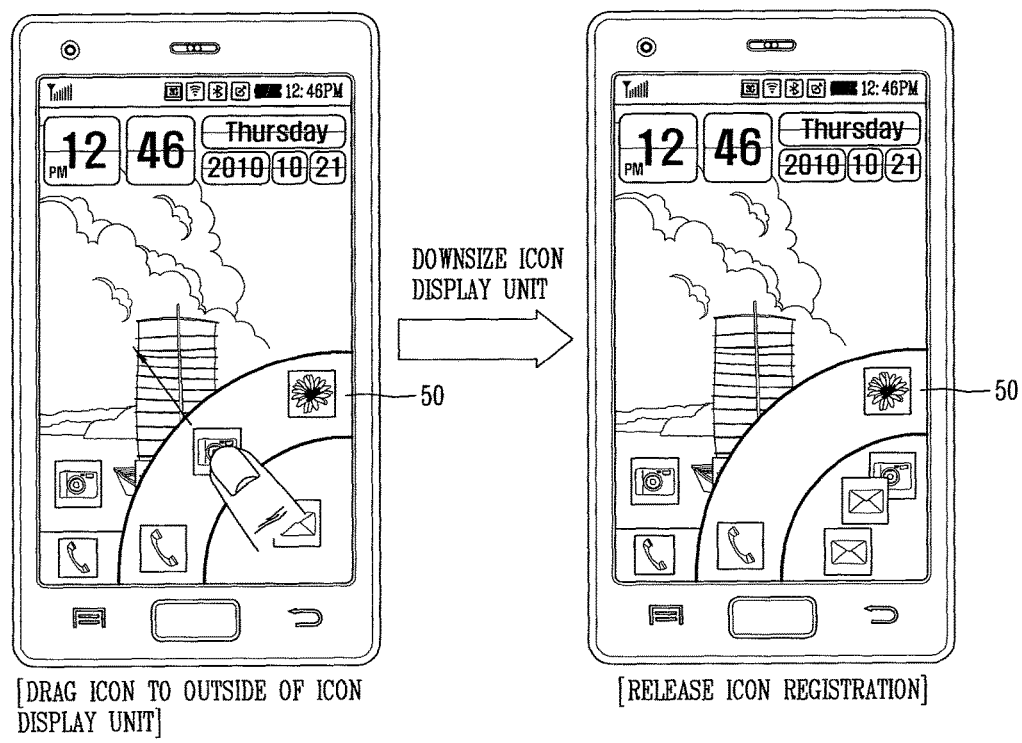

FIGS. 8A and 8B are views illustrating an example of additionally registering an icon to the icon display unit 50 or deleting an icon from the icon display unit. Registering icons to the icon display unit 50 may be performed by selecting a menu displayed at an inner side of the icon display unit 50. However, in an embodiment of the present invention, without using the menu, icons on an idle screen may be directly touched-and-dragged to be registered (added) to the icon display unit 50. When a particular icon is moved to the icon display unit 50 through touch-and-drag manipulation, the controller 180 may duplicate the corresponding icon and display the same in the icon display unit 50. In this instance; however, when the icon (e.g., an address list) displayed in the idle screen is covered by the icon display unit 50 so it cannot be selected, the user may reduce the size of the icon display unit 50 through a touch-and-dragging and then drag the address list to the icon display unit 50, thus registering (adding) the new icon.

Also, as illustrated in FIG. 8B, when the user touches a particular icon registered to the icon display unit 50 and drags the same to the outside of the icon display unit 50, the controller 180 deregisters the corresponding icon. Namely, the controller 180 deletes (release icon registration) the corresponding icon from the icon display unit 50.

Figure 9:
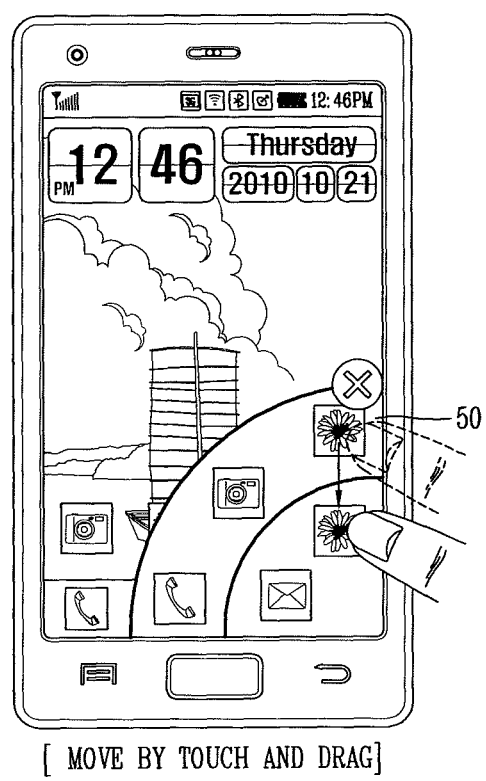
FIG. 9 is a view illustrating an example of moving an icon in the icon display unit.

FIG. 9 is a view illustrating an example of moving an icon in the icon display unit. As illustrated in FIG. 9, the user may move an icon from the rotational region 51 to the fixed region 52 through touch-and-dragging or move an icon from the fixed region 52 to the rotational region 51.

Figure 10:
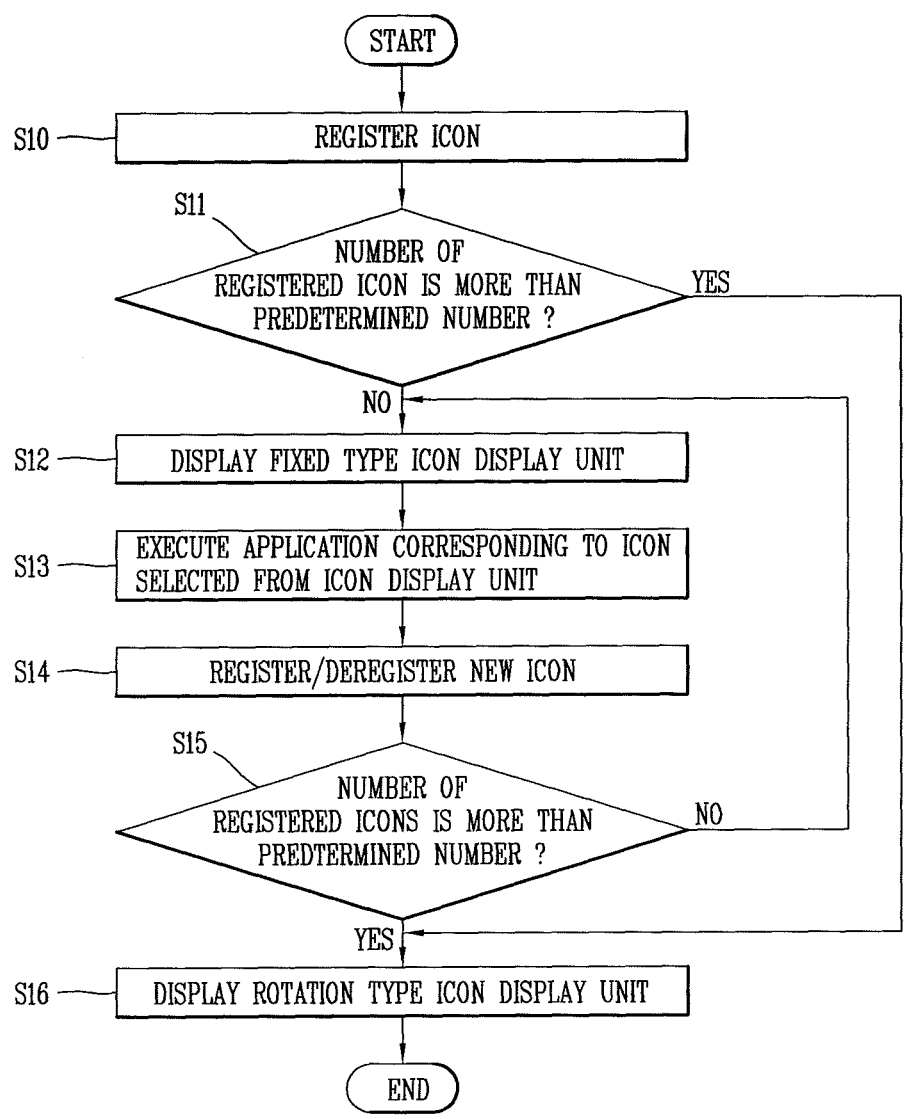
FIG. 10 is a flow chart illustrating a method for arranging icons of a mobile terminal according to an embodiment of the present invention.

FIG. 10 is a flow chart illustrating a method for arranging icons of a mobile terminal according to an embodiment of the present invention. As illustrated in FIG. 10, the user may select a setting of an icon display unit from a menu and register an icon to be displayed in the icon display unit together with various types of information (fixed type or rotation type, for right-handed or left-handed, whether a release button is to be displayed, a display time, a display size, and the like) in relation to the icon display unit (S10). Namely, the setting information may include a display form, a display size, a color, a size change time, and a display release time of the icon display unit.

The controller 180 stores the registered icon together with the set information in the memory 160 and checks whether or not the registered icon is more than a predetermined number of icons (S11). Upon checking, when the number of registered icons is smaller than the predetermined number, the controller 180 displays a fixed type icon display unit 50 (or an icon rotation plate) in a right or left lower end portion of the screen according to the set information (S12) (See FIG. 4). When the registered icons are more than the predetermined number, the controller 180 displays a rotation type icon display unit 50 (or an icon rotation plate) in the right or left lower end portion of the screen according to the set information (S16) (See FIG. 6).

The controller 180 executes an application corresponding to a particular icon selected by the user (S13). Thereafter, when the user registers a new icon to the fixed type icon display unit 50 or when the user deregisters an already registered icon (S14), the controller 180 checks again whether or not the number of icons registered to the icon display unit 50 is more than the predetermined number (S15). When the number of icons registered to the icon display unit 50 is more than the predetermined number, the controller 180 changes the fixed type icon display unit 50 into the rotation type icon display unit 50 and displays the same (S16). When the icons registered to the icon display unit 50 is smaller than the predetermined number, the controller 180 keeps displaying the fixed type icon display unit 50 (S12).

Figure 11:
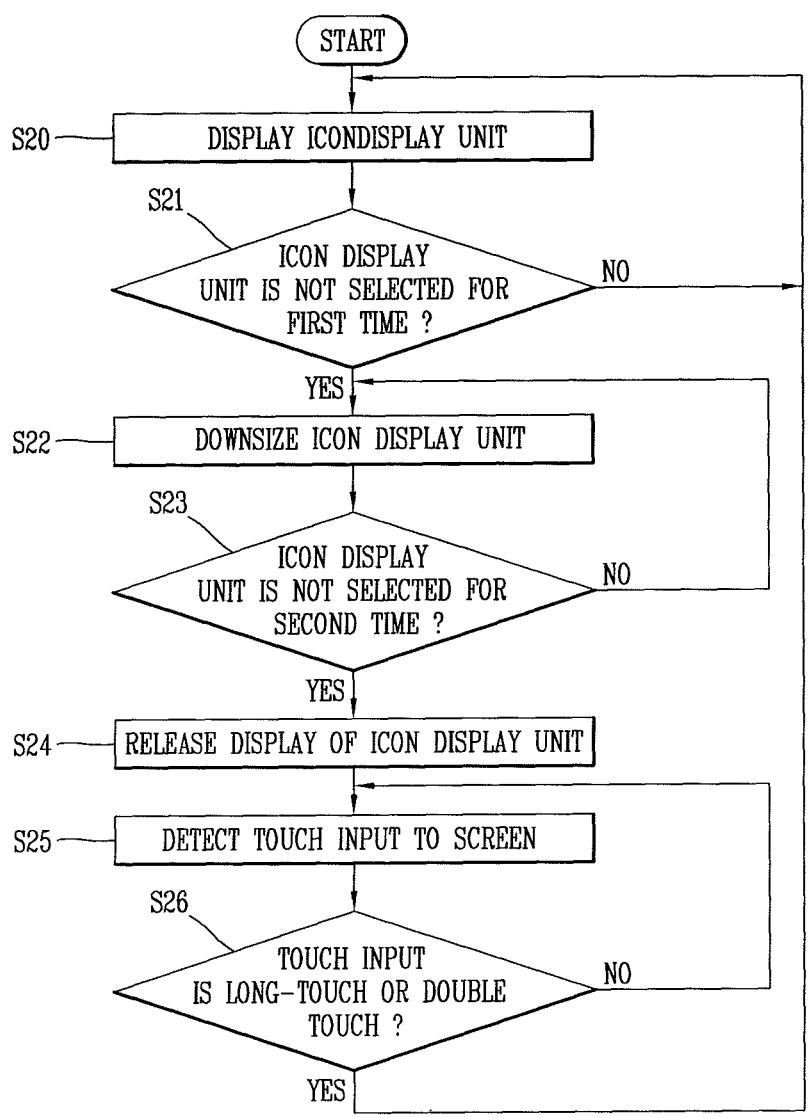
FIG. 11 is a flow chart illustrating an example of controlling the size and display of the icon display unit of a mobile terminal according to an embodiment of the present invention.

FIG. 11 is a flow chart illustrating an example of controlling the size and display of the icon display unit of a mobile terminal according to an embodiment of the present invention. When the icon display unit 50 is displayed on an idle screen, the size of the corresponding icon display unit 50 may be automatically adjusted over time when there is no touch-and-drag input from the user.

As illustrated in FIG. 11, when the icon display unit 50 is displayed, the controller 180 detects a user input to the icon display unit 50 (S20, S21). When the user does not select the icon display unit 50 for a first time, the controller 180 downsizes the corresponding icon display unit 50 to have a minimum size (S22). Thereafter, when the user does not select the icon display unit 50 for a second time, the controller 180 makes the corresponding icon display unit 50 disappear (namely, the controller 180 releases the display of the icon display unit 50) (S23, S24).

Thereafter, when the user touches an idle screen and the corresponding touch is a double-touch or a long-touch, or when the corresponding touch is a home key input (S24, S25), the controller 180 displays the icon display unit 50, which has disappeared, again (S20), or otherwise, the process is returned to step (S25) and the controller 180 detects a touch input.

As described above, according to embodiments of the present invention, when the user grasps (or holds) the mobile terminal, the icon display unit including frequently used icons is displayed in a screen region in which the movement of user's thumb reaches, In addition, movement of the icon display unit, change in size of the icon display unit, change in display form, and icon registration and deregistration of the icon display unit are performed, whereby the user can freely touch a desired icon within the radius of his thumb to execute the same.

In the embodiments of the present invention, the foregoing method may be implemented as codes that can be read by a processor in a program-recorded medium. The processor-readable medium may include any types of recording devices in which data that can be read by a computer system is stored. The computer-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet). The computer may include a controller of a terminal.

The mobile terminal according to the embodiments of the present disclosure is not limited in its application of the configurations and methods, but the entirety or a portion of the embodiments can be selectively combined to be configured into various modifications.

As the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method of controlling a mobile terminal, the method comprising:
   displaying an icon display region in an edge portion of a screen of the mobile terminal, the icon display region being identified by a border;
   in response to a selection of the icon display region, displaying the icon display region including at least one registered icon in an expanded portion of the screen;
   in response to a first touch input applied to the at least one registered icon, executing a particular application corresponding to the at least one registered icon; and
   in response to registering an icon that causes the number of the at least one registered icon to exceed a predetermined number, automatically changing an icon arrangement of the at least one registered icon of the icon display region from being displayed as a non-rotatable icon arrangement to being displayed as a rotatable icon arrangement,
   wherein, prior to the selection of the icon display region, no icon is displayed in the icon display region, and
   wherein the rotatable icon arrangement of the icon display region includes a fixed region having at least one application icon and the rotational icon display region having a plurality of registered icons, the rotational region being rotatable in a clockwise direction or counterclockwise direction according to a manipulation touch input while the fixed region is not rotatable.

2. The method of claim 1, wherein a shape of the icon display region, that includes the at least one registered icon, is a fan-shape when the icon display region is displayed on the edge portion of the screen.

3. The method of claim 1, further comprising:
   displaying the icon display region as increasing or decreasing in size according to a second touch input applied to the icon display region,
   wherein the edge portion of the screen is a corner edge portion of the screen.

4. The method of claim 1, further comprising:
   in response to touching and dragging the icon display region, adjusting the size of the icon display region in the expanded portion of the screen in accordance with a dragging distance,
   wherein when the dragging of the icon display region is performed by more than a predetermined distance, the icon display region is downsized to have a minimum size.

5. The method of claim 1, wherein the edge portion includes a lower edge portion of a right side of the screen for a right-handed user or a lower edge portion of a left side of the screen for a left-handed user.

6. The method of claim 1, wherein, when there is no touch input during a first set time after the icon display region is displayed, a display size of the icon display region is reduced, and when there is no touch input during a second set time longer than the first set time after the icon display region is reduced, the icon display region disappears from the screen.

7. The method of claim 6, wherein, when a long-touched input or a double-touched input is received from a certain portion of the screen or a home key is received after the icon display region has disappeared, the icon display region is redisplayed.

8. The method of claim 1, further comprising:
   registering an icon when the icon is dragged to an interior of the icon display region from an exterior of the icon display region and releasing the at least one registered icon when the at least one registered icon is dragged to the exterior of the icon display region.

9. The method of claim 1, wherein as the icon display region is expanded, additional registered icons are displayed within the icon display region.

10. The method of claim 1, wherein the screen on the mobile terminal is an idle screen and the icon display region is displayed on the idle screen.

11. The method of claim 10, wherein the icon display region is displayed as at least partially overlapping another icon displayed on the idle screen.

12. The method of claim 1, wherein a position of the icon display region remains fixed when the particular application is executed.

13. A mobile terminal, comprising:
   a wireless communication unit configured to provide wireless communication;
   a display unit configured to display an icon display region in an edge portion of a screen of the display unit, the icon display region being identified by a border; and
   a controller configured to:
   receive a selection of the icon display region,
   control the display unit to display the icon display region including at least one registered icon in an expanded portion of the screen based on the received selection,
   receive a first touch input applied to the at least one registered icon,
   execute a particular application corresponding to the at least one registered icon based on the received first touch input, and
   in response to registering an icon that causes the number of the at least one registered icon to exceed a predetermined number, automatically change an icon arrangement of the at least one registered icon of the icon display region from being displayed as a non-rotatable icon arrangement to being displayed as a rotatable icon arrangement,
   wherein, prior to receiving the selection of the icon display region, the controller is configured to display no icon in the icon display region, and
   wherein the rotatable icon arrangement of the icon display region includes a fixed region having at least one application icon and the rotational icon display region having a plurality of registered icons, the rotational region being rotatable in a clockwise direction or counterclockwise direction according to a manipulation touch input while the fixed region is not rotatable.

14. The mobile terminal of claim 13, wherein a shape of the icon display region, that includes the at least one registered icon, is a fan-shape when the icon display region is displayed on the edge portion of the screen.

15. The mobile terminal of claim 13, wherein the controller is further configured to:
   display the icon display region as increasing or decreasing in size according to a second touch input applied to the icon display region, and
   wherein the edge portion of the screen is a corner edge portion of the screen.

16. The mobile terminal of claim 13, wherein the icon display region is changed from an arrangement of the at least one registered icon of the icon display region being displayed as the rotatable icon arrangement to being displayed as the non-rotatable icon arrangement when the number of the at least one registered icon is less than the predetermined number.

17. The mobile terminal of claim 13, wherein the edge portion includes a lower edge portion of a right side of the screen for a right-handed user or a lower edge portion of a left side of the screen for a left-handed user.

* * * * *